(No Model.) 2 Sheets—Sheet 1.

J. C. POTTS.
FRICTION CLUTCH.

No. 357,095. Patented Feb. 1, 1887.

Witnesses:
John E. Parker
William D. Conner

Inventor:
Joseph C. Potts
by his Attorneys
Howson and Son (No Model.) 2 Sheets—Sheet 2.
J. C. POTTS.
FRICTION CLUTCH.
No. 357,095. Patented Feb. 1, 1887.
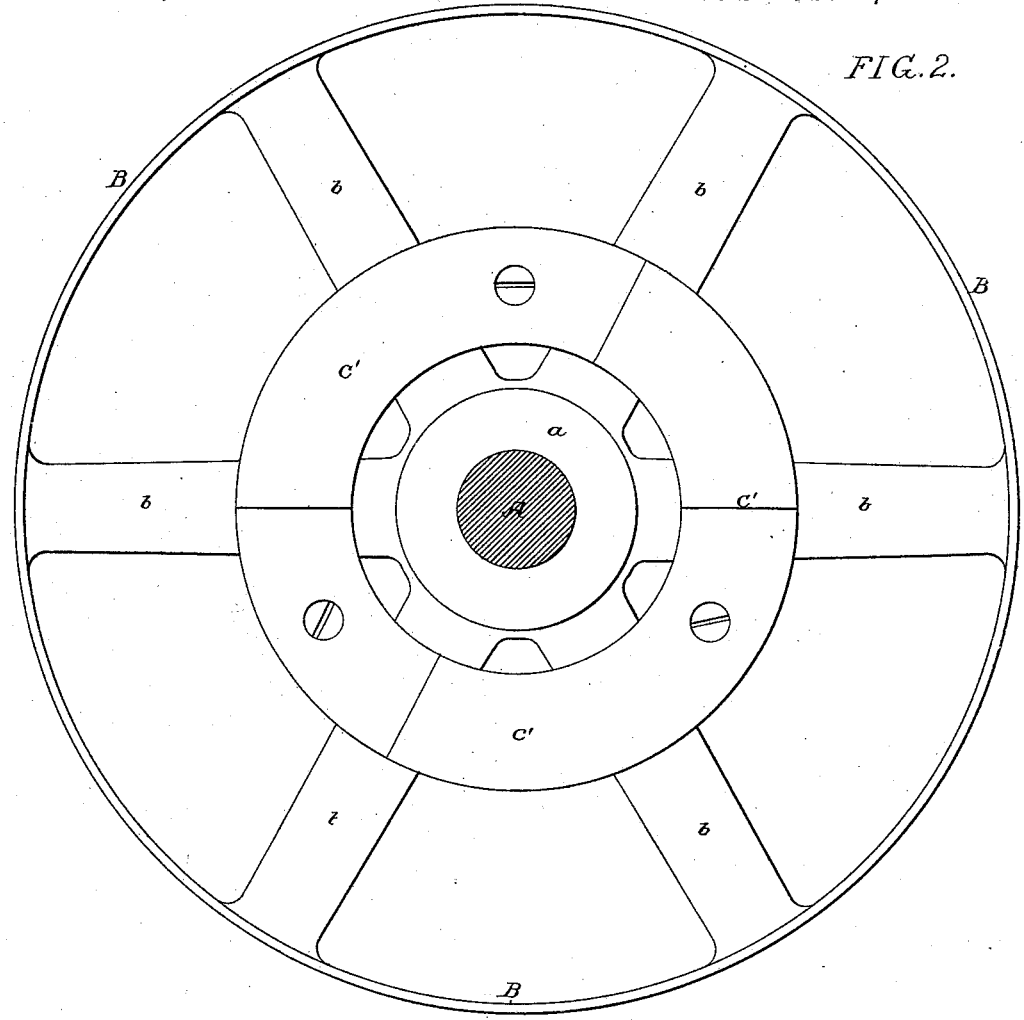
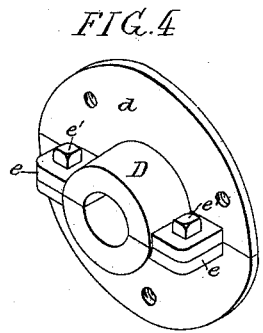
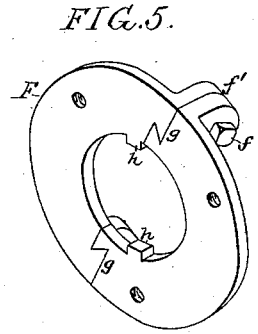
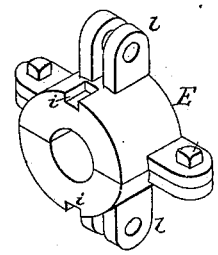
Witnesses:
John E. Parker
William D. Conner
Inventor:
Joseph C. Potts.
by his Attorneys
Howson and Sons

UNITED STATES PATENT OFFICE.

JOSEPH C. POTTS, OF BERWYN, PENNSYLVANIA.

FRICTION-CLUTCH.

SPECIFICATION forming part of Letters Patent No. 357,095, dated February 1, 1887.

Application filed June 14, 1886. Serial No. 205,043. (No model.)

*To all whom it may concern:*

Be it known that I, JOSEPH C. POTTS, a citizen of the United States, residing in Berwyn, Chester county, Pennsylvania, have invented certain Improvements in Friction-Clutches, of which the following is a specification.

One object of my invention is to effect the ready conversion of an ordinary belt-pulley into a clutch-pulley, and a further object is to so construct the clutching devices that they can be conveniently applied to the shaft and pulley without disturbing either.

Figure 1:
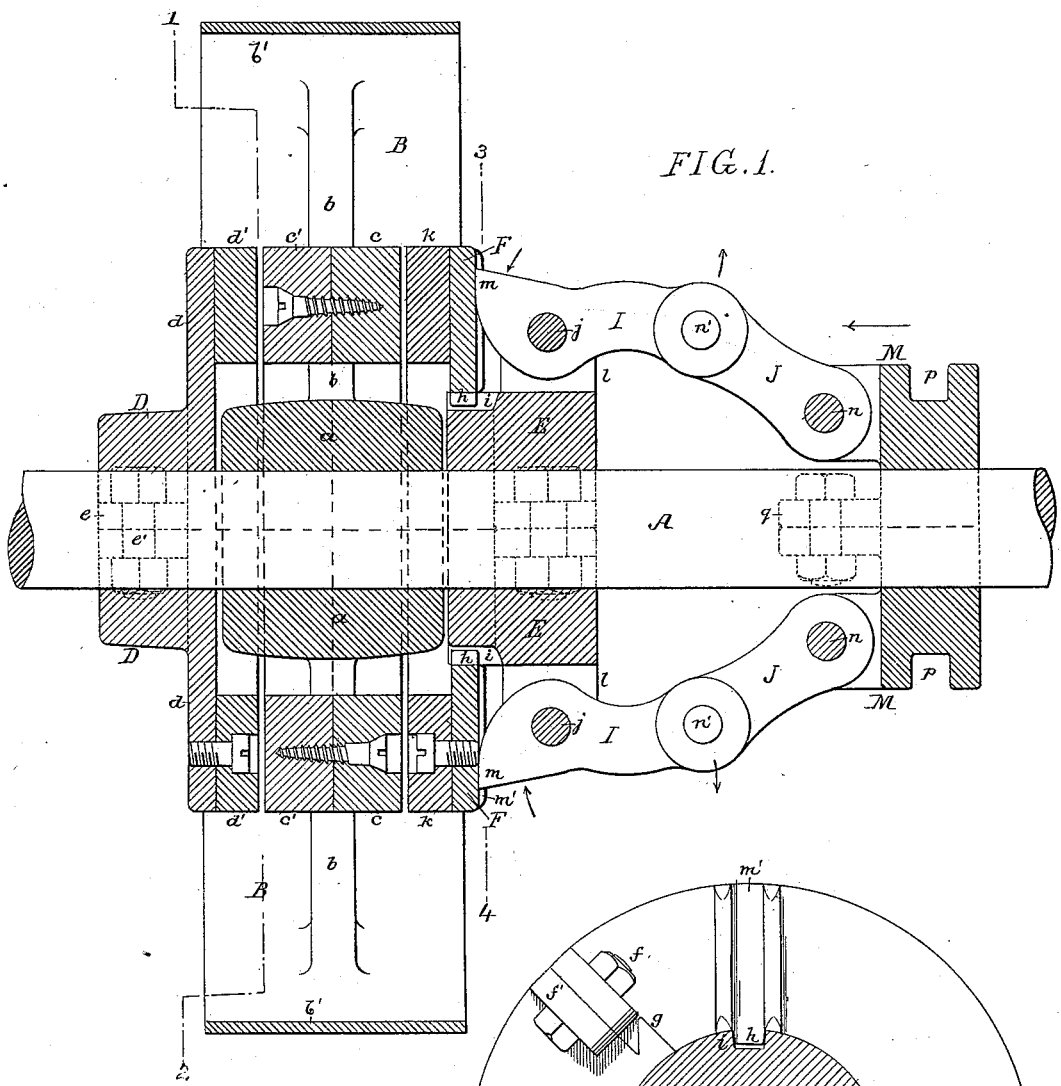
Figure 3:
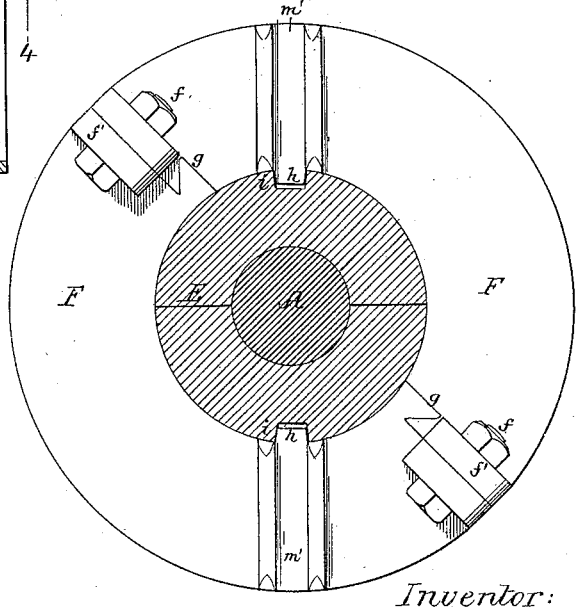

In the accompanying drawings, Figure 1 is a longitudinal section showing the clutching devices applied to the pulley and shaft; Fig. 2, a transverse section on the line 1 2, Fig. 1; Fig. 3, a transverse section on the line 3 4, Fig. 1; and Figs. 4, 5, and 6, detached perspective views on a reduced scale of different portions of the clutch.

A is a rotary shaft, to which power may be applied, and on which is a loose pulley, B, having the hub $a$, spokes $b$, and rim $b'$, of ordinary construction.

Clamped to the spokes $b$, on opposite sides of the same, are two friction-rings, $c$ $c'$, which in the present instance are held together and to the spokes by ordinary wood-screws. These rings, which I prefer to make of wood, are divided transversely, as shown in Fig. 2, in order that they may be easily applied to the spokes without disturbing the wheel or shaft.

Clamped to the shaft A, at one side of the wheel B, is a split hub, D, Fig. 4, having a flange, $d$, which forms a clutch-ring and carries a friction-ring, $d'$, Fig. 1, also made in halves and secured to the flange $d$ by screws. This friction-ring $d'$, when the pulley is not clutched to the shaft, is just clear of the friction-ring $c'$. In the present instance the hub D is secured to the shaft A by clamping set-screws $e'$, passing through ears $e$ on the hub, as shown in Fig. 4.

On the shaft A, on the opposite side of the pulley B from the ring $d'$, is a split hub, E, secured by set-screws passing through ears on the hub in the same manner as the hub D. A clutch-ring, F, Figs. 3 and 5, also in two parts, held together by bolts $f$, is mounted on the hub E so as to be free to slide thereon, the joint between the halves of this ring having a dovetailed portion at $g$ $g$, Fig. 3, so as to hold the two halves of the ring together when adjusting it to its place on the collar. The clutch-ring F is supplied with a friction-ring, $k$, secured by screws in the same manner as the ring $d'$ is secured to the clutch-ring $d$.

On the inner periphery of the ring F are two lugs, $h$ $h$, which are adapted to grooves $i$ in the hub E, Fig. 6, and which thus insure the turning of the ring F with the hub E, while allowing it to have an independent sliding movement toward and from the pulley B.

Levers I—two in the present instance—are pivoted at $j$ to lugs $l$ on the hub E. One arm, $m$, of each lever acts as a cam, which bears against the outer face of the ring F, and is guided in radial grooves $m'$ therein. The other arm of each lever is connected to a sliding collar, M, by links J, Fig. 1, the links being pivoted to the collar at $n$ and to the levers at $n'$, thus forming a double knee-joint. The collar M is grooved at $p$ for the reception of the usual clutch-operating lever. This sliding collar M is also made in two parts, which are fastened together by bolts passing through lugs $q$, Fig. 1. The hubs D and E are thus secured to the shaft, the pulley B is loose thereon, and the sleeve M is free to slide on the shaft.

To apply the clutch the sleeve M is moved in the direction of its arrow, Fig. 1, forcing the cams of the levers I in the direction of their arrows. These cams press against the clutch-ring F, and force the friction-ring $k$ against the friction-ring $c$ of the pulley. A continued movement of the sleeve M causes the pulley B to move longitudinally on the shaft, and thus bring the friction-ring $c'$ of the pulley into contact with the friction-ring $d'$ on the clutch-ring $d$. The pulley is thus firmly clamped between the two clutch-rings and caused to rotate therewith. By moving the collar M in the opposite direction the clutch-ring F will free itself from the pulley B, and in turn the pulley will be freed from the clutch-ring $d$.

The frictional surfaces may be extended to the rim of the pulley; but this will depend on the power required. The ring F may slide on the shaft instead of on the hub E; but I prefer the construction shown.

Other devices than screws may be used to secure the friction-rings on the pulley and to the clutch-rings without departing from my invention, and other devices than the levers I and links J may be used; but they are the best adapted for the purpose.

I am aware that a pulley has been provided with a ring on the inner side of the rim for being clutched between clamping-rings, and also that a pulley or drum has had its opposite ends provided with friction plates or disks to be clamped between a fixed and a movable disk on the shaft; hence I do not broadly claim such combination, my invention having for its main object the conversion of an ordinary belt-pulley into a clutch-pulley, which is effected by applying the clutching-rings to the web or spokes of the pulley between the hub and rim, and a further feature of the invention being the dividing of all of the clutching devices transversely, so that they can be conveniently applied to a shaft and pulley already in position without disturbing said pulley or shaft.

I therefore claim as my invention—

1. The combination of the pulley, having hub, spokes, and rim, with clutching-rings occupying positions on opposite sides of the spokes of the pulley, between the hub and rim, and confined to and carried by said spokes, all substantially as specified.

2. The combination of the shaft and the pulley loose thereon with opposite friction-rings, a fixed clutch-ring, and a longitudinally-movable clutch-ring, all of said rings being divided transversely, whereby they can be applied to the shaft and pulley without disturbing either of the latter, all substantially as specified.

3. The combination of the shaft, the loose pulley having opposite friction-rings, the fixed clutch-ring on one side of the pulley, a movable clutch-ring having internally-projecting lugs, and a hub secured to the shaft and having longitudinal grooves for the reception of said lugs, all substantially as specified.

4. The combination of the grooved hub secured to the shaft, clutch-levers hung thereto, and a movable clutch-ring having radial grooves for the reception of the clutch-levers and internal lugs adapted to the grooves of the hub, all substantially as specified.

In testimony whereof I have signed my name to this specification in the presence of two subscribing witnesses.

JOS. C. POTTS.

Witnesses:
HENRY HOWSON,
WILLIAM D. CONNER.